(12) United States Patent
Soto et al.

(10) Patent No.: US 8,382,598 B2
(45) Date of Patent: Feb. 26, 2013

(54) MODULARITY SPACER FOR A DAMPER

(75) Inventors: Andre Soto, Tallmadge, OH (US); Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 508 days.

(21) Appl. No.: 12/288,476

(22) Filed: Oct. 21, 2008

(65) Prior Publication Data

US 2009/0110475 A1   Apr. 30, 2009

(51) Int. Cl.
*F16F 15/121*   (2006.01)
(52) U.S. Cl. .................................. 464/68.8; 464/68.1
(58) Field of Classification Search ............... 464/46, 464/68.41, 68.8, 68.1; 192/213.2–213.22
See application file for complete search history.

(56) References Cited

U.S. PATENT DOCUMENTS

| | | | |
|---|---|---|---|
| 2,042,570 A * | 6/1936 | Wemp | 464/68.41 X |
| 3,817,362 A * | 6/1974 | Rist | 192/213.22 |
| 4,562,912 A * | 1/1986 | Kabayama | 192/213.21 |
| RE37,465 E * | 12/2001 | Reik et al. | 464/68.41 X |
| 7,077,253 B2 | 7/2006 | Maienschein | |
| 2007/0191118 A1 * | 8/2007 | Saeki et al. | 464/46 |

* cited by examiner

*Primary Examiner* — Gregory Binda
(74) *Attorney, Agent, or Firm* — Simpson & Simpson, PLLC

(57) ABSTRACT

A spacer assembly for a series damper, including: at least one fastening element with protrusions arranged to be fixedly secured to first and second cover plates for the damper; and at least one spacer element fixedly secured to the at least one fastening element and arranged to be axially disposed between the second cover plate and a flange for the damper. The at least one fastening element is arranged to be partially rotatable with respect to the flange. A damper assembly, including: a first damper with first and second cover plates and a flange; and a modularity spacer assembly including at least one fastening element fixedly secured to the first and second cover plates and partially rotatable with respect to the flange and at least one annular spacer element fixedly secured to the at least one fastening element and axially disposed between the second cover plate and the flange.

5 Claims, 4 Drawing Sheets

MODULARITY SPACER FOR A DAMPER

CROSS-REFERENCE TO RELATED APPLICATIONS

This application claims the benefit under 35 U.S.C. §119(e) of U.S. Provisional Application No. 61/000,306 filed on Oct. 25, 2007 which application is incorporated herein

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a spacer for use in a series damper to enhance the modularity of component parts in the damper.

BACKGROUND OF THE INVENTION

It is known to shape the flange for one of the dampers in a series damper, in particular, a distal radial end of the flange, to enable a specific position of the flange with respect to a cover plate for the damper, for example, positioning the flange to enable friction between the flange and the cover plate or to prevent friction between the flange and the cover plate. Unfortunately, the same shaped flange is generally not usable for friction and non-friction configurations for the damper, decreasing the modularity of a particular flange and increasing the cost and complexity of producing the friction and non-friction configurations for the damper. In like manner, the same shaped flange may not be usable between different series damper configurations.

FIG. 4 is a partial cross-sectional view of prior art series damper 300 in a torque converter and is an example of a damper with a flange shaped and positioned to provide friction between the flange and a cover plate. Specifically, to provide a hysteresis force for damper 302 in the series damper, flange 304 is stepped in region 306, for example, the flange is bent in direction 308, so that portion 310 is substantially in contact with cover plate 312. Then spring 314 urges the flange against the cover plate to provide the desired hysteresis force for damper 302. In some series damper configurations (not shown), for example, a turbine damper configuration in which the cover plate that is equivalent to cover plate 312 is connected to a turbine hub, the cover plate is located closer to the turbine. Thus, to maintain contact between the flange and the cover in this configuration, it is unfortunately necessary to modify the flange, for example, to increase the step in the flange equal to the amount by which the cover plate is moved closer to the turbine. For example, flange 304 cannot be used in this configuration, since there will be gap between the flange and the cover plate and subsequently, there will be no friction between the flange and the cover plate. Thus, the same flange cannot be used for both the configuration shown in FIG. 4 and for the re-configuration noted above, which, unfortunately, limits the modularity of the flange and increases the cost and complexity of fabricating the series damper.

Thus, the differences in spacing between the flange and the cover plate inherent in various damper configurations unfortunately requires that differently stepped flanges be used in the respective configurations depending on the desired performance of the dampers, for example, with or without friction forces between the flange and the damper.

Thus, there is a long-felt need for a means of increasing the modularity of component parts for a series damper to increase the usability of the component parts among a greater variety of series damper configurations.

BRIEF SUMMARY OF THE INVENTION

The present invention broadly comprises a modularity spacer for a series damper, including: at least one fastening element with at least one first protrusion arranged to be fixedly secured to a first cover plate for the damper and at least one second protrusion arranged to be fixedly secured to a second cover plate for the damper; and at least one spacer element fixedly secured to the at least one fastening element and arranged to be axially disposed between the second cover plate and a flange for the damper. The at least one fastening element is arranged to be partially rotatable with respect to the flange.

In some aspects, the damper includes a resilient element arranged to urge the flange into frictional engagement with the at least one spacer element. In some aspects, the resilient element is engaged with the first cover plate. In some aspects, the at least one fastening element is arranged to be disposed in a respective radially opening slot in the flange. In some aspects, the at least one spacer element is a single annular-shaped piece.

The present invention also broadly comprises a damper assembly, including: a first damper with first and second cover plates and a flange; and a modularity spacer assembly including at least one fastening element fixedly secured to the first and second cover plates and partially rotatable with respect to the flange and at least one annular spacer element fixedly secured to the at least one fastening element and axially disposed between the second cover plate and the flange.

In some aspects, the at least one fastening element includes at least one first and second protrusion disposed in at least one first and second opening in the first and second cover plates, respectively. In some aspects, the damper assembly includes a resilient element urging the flange into frictional engagement with the at least one spacer element. In some aspects, the damper assembly includes a second damper with a cover and the flange includes the cover for the second damper. In some aspects, the at least one fastening element is disposed in a respective radially opening slot in the flange. In some aspects, the at least one spacer element is a single annular-shaped piece.

It is a general object of the present invention to provide a means of increasing the modularity of parts used in a damper.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
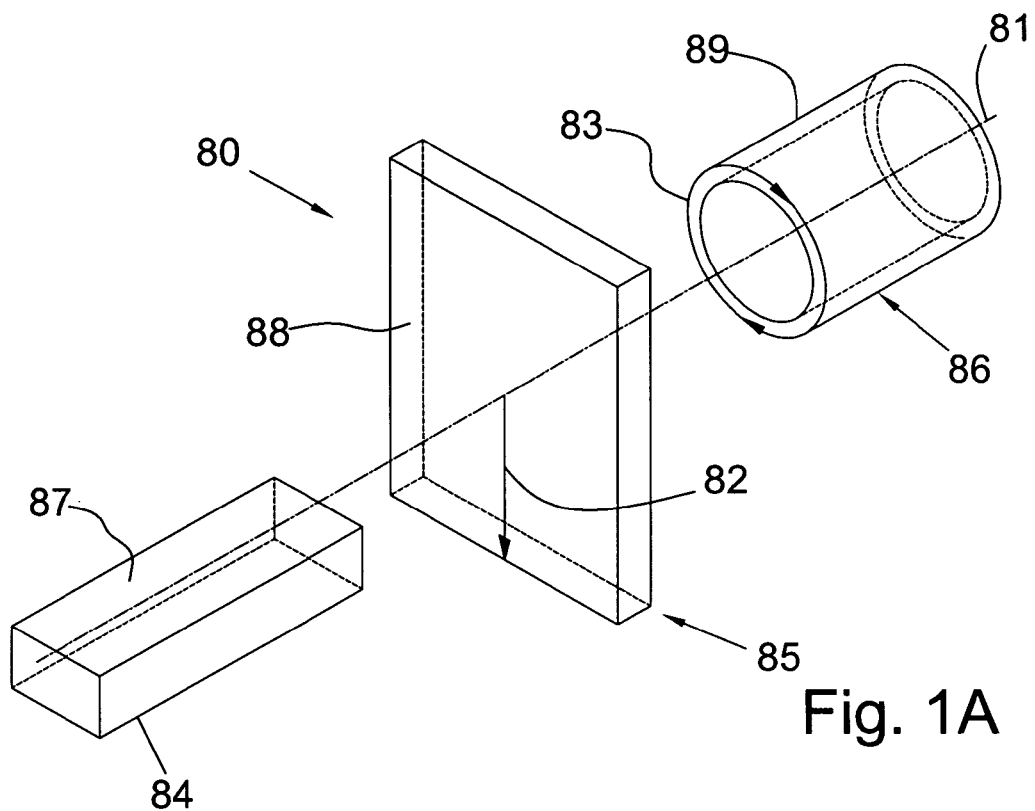
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
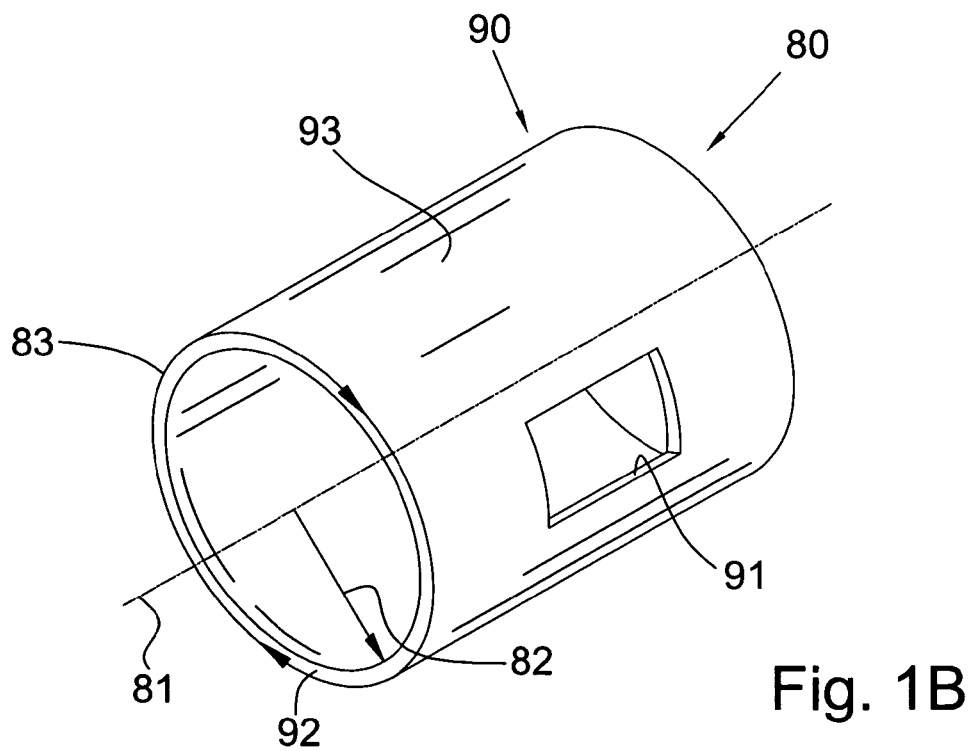
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
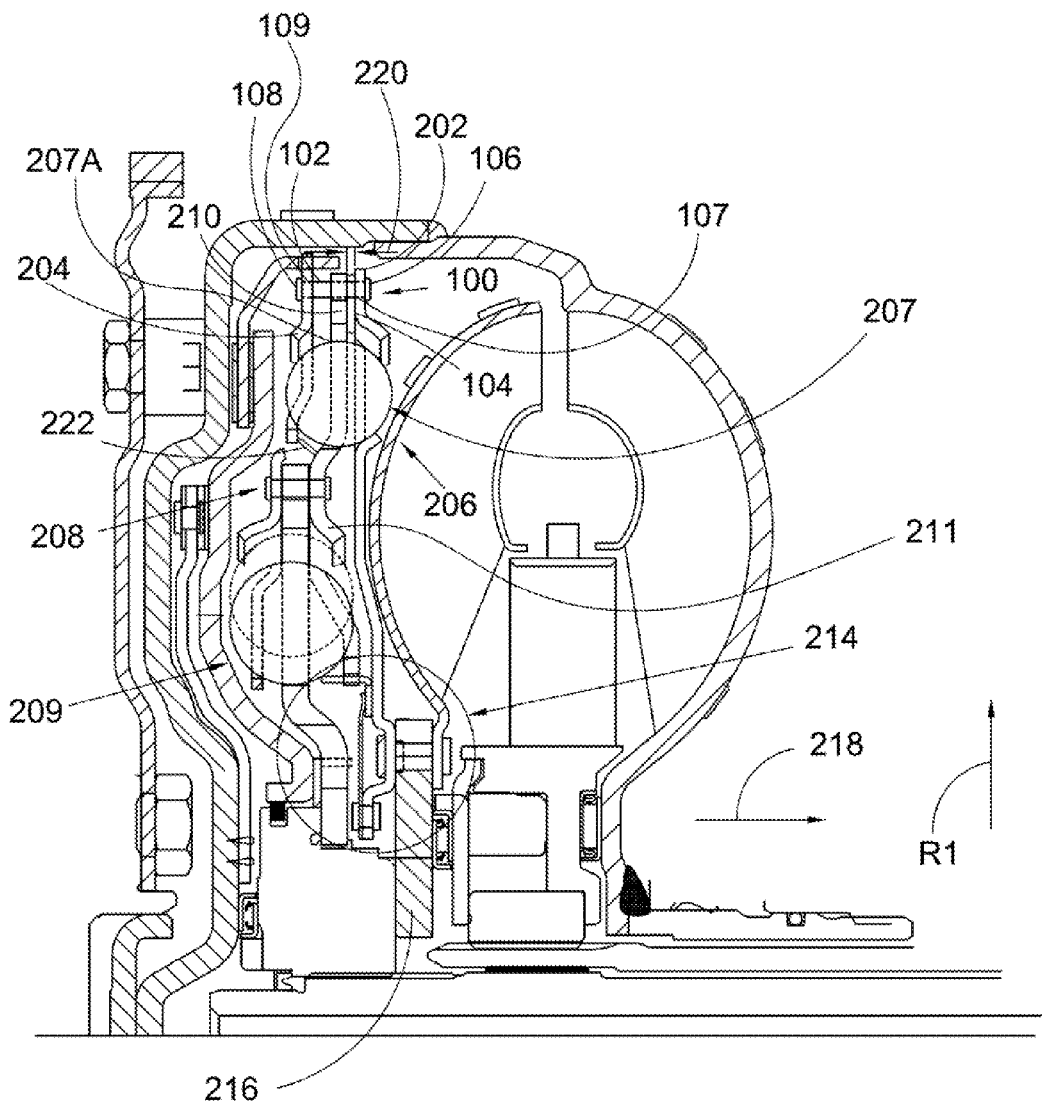
FIG. 2 is a partial cross-sectional view of a series damper with a present invention modularity spacer assembly.

FIG. 2 is a partial cross-sectional view of a series damper with present invention modularity spacer assembly 100.

Figure 3:
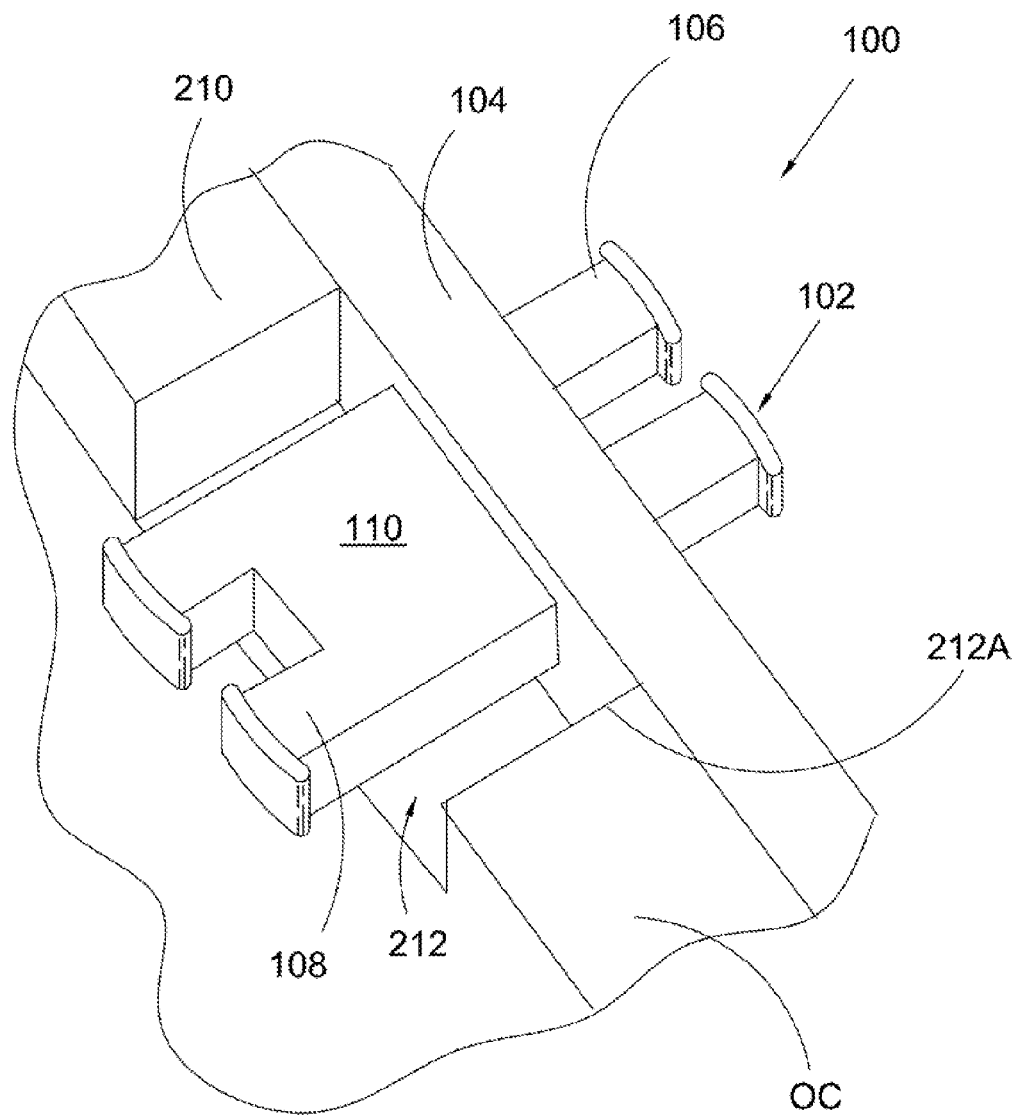
FIG. 3 is partial perspective top view of area 3 in FIG. 2 with the cover plates removed; and, FIG. 4 is a partial cross-sectional view of a prior art series damper in a torque converter.
Figure 4:
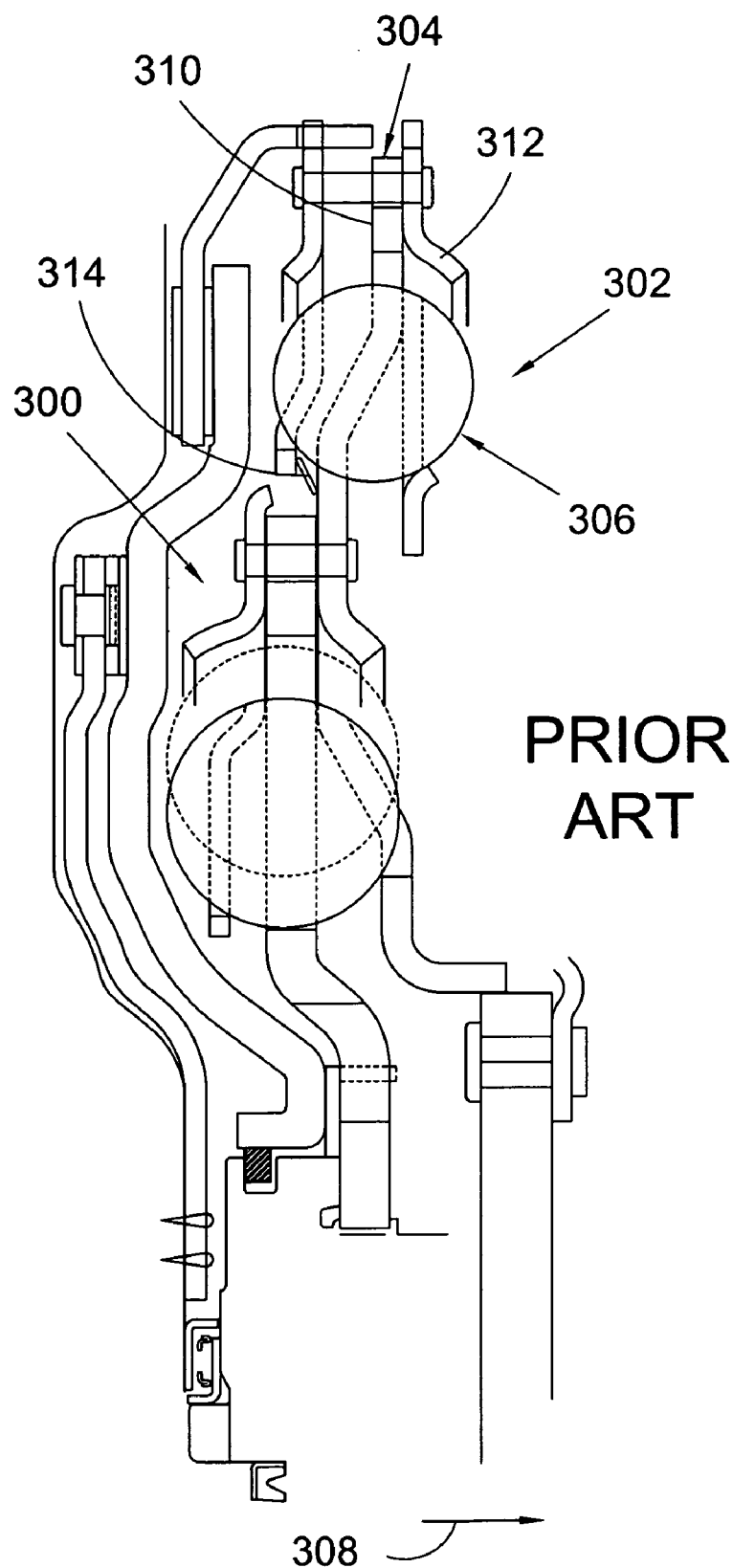

FIG. 3 is a partial perspective top view of area 3 in FIG. 2 with the cover plates removed. The following should be viewed in light of FIGS. 2 and 3. It should be understood that assembly 100 can be used in a damper assembly that includes a plurality of dampers, for example, a series damper as shown in the figures, or in a damper assembly (not shown) that includes only a single damper. Assembly 100 includes at least one fastening element 102 and at least one spacer element 104. It should be understood that assembly 100 is not limited to a particular number of elements 102 or elements 104. Element 102 is fixedly secured to cover plates 202 and 204 of damper 206 in series damper 208, by any means known in the art. Spring 207 in damper 206 is circumferentially aligned with cover plates 202 and 204. Series damper 208 includes damper 209 with cover 211. In some aspects element 102 includes at least one protrusion 106 disposed in at least one opening 107 in cover plate 202 and fixedly secured to cover plate 202. In some aspects element 102 includes at least one protrusion 108 disposed in at least one opening 109 in cover plate 204 and fixedly secured to cover plate 204. Element 102 is partially rotatable with respect to flange 210 of damper 206. In some aspects, flange 210 is continuous with cover plate 211 and forms cover 211. In some aspects, portion 110 of element 102 is disposed in radially opening slot 212 of the flange. By radially opening, we mean the opening for the slot is in a radial direction. That is, portion 110 is arranged to be circumferentially interleaved with the flange. Alternately stated, portion 110 is circumferentially aligned with at least a portion of the radial walls for the slots. The circumferential extent of the slot is greater than the circumferential extent of portion 110, creating rotational lash between element 102 and the flange. In some aspects (not shown), the flange includes one or more openings in which element 102 is disposed. Element 104 is axially disposed between the flange and cover plate 202. Element 104 is entirely disposed radially outward of radially outermost point 207A of a spring 207. That is, every portion of element 104 is disposed radially outward of point 207A in radial direction R1. Radially opening slot 212 has opening 212A facing in radial direction R1 away from spring 207. Opening 212A is formed at outer circumference OC of flange 210.

In some aspects, the portion of damper 208 in area 214 is configured as described in the commonly assigned United States Provisional Patent Application titled "SERIES DAMPER WITH HYSTERESIS IN ONE DAMPER," inventors Craig Kneidel, Andre Soto, and Patrick Lindemann, filed on the same day as the present application. Specifically, cover plate 202 is fixedly secured to turbine hub 216. Cover plate 202 is further in direction 218 than respective cover plates for other series damper configurations. Thus, if flange 210 has the same step as the respective flanges for the other configurations, for example, to enable the same flange to be used in more than one series damper configuration, an axial space 220 is created between flange 210 and cover 202. Spacer element 104 occupies space 220 enabling the use of the other series dampers with the above configuration of plate 202.

As noted supra, there is lash between the fastening element and the slot in the flange. Since the fastening and spacer elements are fixedly secured to one another and the fastening element is fixedly secured to plate 202, flange 210 also is partially rotatable with respect to plate 202. In some aspects, damper 200 includes resilient element 222, which can be any resilient element known in the art, for example, a diaphragm spring. The resilient element urges the flange into frictional engagement with the spacer element. In some aspects, element 222 is engaged with cover 204 and flange 210 and urges the flange in direction 218. As a result, the flange is brought into frictional engagement with the spacer element and a hysteresis force is generated between the flange and the spacer element. Since the spacer element is fixed to cover plate 202, the hysteresis force is with respect to the flange and cover plate 202. Without resilient element 222, damper 206 operates with little or no hysteresis force between flange 210 and plate 202.

The fastening element can be fastened to plates 202 and 204 by any means known in the art. In some aspects, protrusions 106 or 108 are formed to function as rivets. That is, the protrusions are disposed in respective openings (not shown) in plates 202 and 204 and are smashed or peened to expand into the openings or to overlap onto respective radial surfaces for the plates. It should be understood that element 100 is not limited to the configuration or shape shown and that other configurations and shapes are within the spirit and scope of the claimed invention. In some aspects, spacer element 104 is a single ring-shaped, or annular-shaped, piece; however, the spacer element can include various notches, slots, or other features. In some aspects, the at least one spacer element 104 includes a plurality of separate pieces. In general, each piece is associated with a respective element 102. It also should be understood that assembly 100 is not limited to a particular number of elements 102 and that other sizes, shapes, and configurations of elements 102 are within the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A damper assembly, comprising:
    a damper with first and second cover plates and a flange and with at least one spring circumferentially aligned with each of the first and second cover plates and having a radially outermost point;
    a modularity spacer assembly including:
        at least one fastening element fixedly secured to the first and second cover plates, disposed in at least one slot in the flange, and partially rotatable with respect to the flange; and,
        at least one spacer element fixedly secured to the at least one fastening element, disposed radially outward of the radially outermost point of the at least one spring such that every portion of the at least one spacer is radially outward of the radially outermost point of the at least one spring, and axially disposed between the second cover plate and the flange; and,
    a resilient element:
        disposed between the first cover plate and the flange in an axial direction;
        in contact with the first cover plate and the flange; and,
        urging the flange into contact with the spacer element, wherein:
            the first cover plate is free of contact with every spacer element in the at least one spacer element; and,
            the at least one slot has an opening facing in a radial direction away from the at least one spring and formed at an outer circumference of the flange.

2. The damper assembly of claim 1 wherein the at least one fastening element includes at least one first and second protrusion disposed in at least one first and second opening in the first and second cover plates, respectively.

3. The damper assembly of claim 1 further including a second damper with a cover, wherein the flange includes the cover for the second damper.

4. The damper assembly of claim 1 wherein the at least one spacer element is a single annular piece.

5. A series damper, comprising:
    an output;
    a first damper with first and second cover plates and a first flange and with at least one first spring circumferentially aligned with each of the first and second cover plates;
    a second damper located radially inward of the first damper and including:
        an input including a third cover plate non-rotatably connected to the first flange;
        at least one second spring located radially inward of the at least one first spring and at least partially misaligned with respect to at least one first spring in a radial direction; and,
        a second flange non-rotatably connected to the output;
    a modularity spacer assembly including:
        at least one fastening element fixedly secured to the first and second cover plates, disposed in at least one radially opening slot in the first flange, and partially rotatable with respect to the first flange; and,
        an annular spacer element fixedly secured to the at least one fastening element and axially disposed only between the second cover plate and the first flange; and,
    a resilient element:
        entirely disposed radially outward of the at least one second spring;
        disposed axially between the first cover plate and the flange;
        in contact with the first cover plate and the flange; and,
        urging the first flange into frictional engagement with the spacer element, wherein:
            the at least one slot has an opening facing in a radial direction away from the at least one first spring and formed at an outer circumference of the first flange; and,
            the first cover plate is free of contact with every spacer element in the at least one spacer element.

* * * * *